US005596637A

United States Patent [19]
Pasetti et al.

[11] Patent Number: 5,596,637
[45] Date of Patent: Jan. 21, 1997

[54] POWER DISSIPATION MANAGER CIRCUIT FOR AN INTERFACE DEVICE FEEDING A SUBSCRIBER TELEPHONE LINE

[75] Inventors: Mauro Pasetti; Vanni Saviotti; Aldo Torazzina, all of Milano, Italy

[73] Assignee: SGS-Thomson Microelectronics, S.r.l., Agrate Brianza, Italy

[21] Appl. No.: 236,529

[22] Filed: May 2, 1994

[51] Int. Cl.⁶ .................................................. H04M 19/00
[52] U.S. Cl. ........................... 379/399; 379/413; 379/324
[58] Field of Search ........................................ 379/413, 412, 379/398, 399, 324; 330/265, 268; 361/119

[56] References Cited

U.S. PATENT DOCUMENTS

| | | | |
|---|---|---|---|
| 4,381,427 | 4/1983 | Cheal et al. | 370/110.1 |
| 4,387,273 | 6/1983 | Chea, Jr. | 379/413 |
| 4,491,804 | 1/1985 | Main et al. | 330/265 |
| 4,709,388 | 11/1987 | Defretin | 379/413 |
| 4,782,507 | 11/1988 | Siligoni et al. | 379/413 |
| 4,908,856 | 3/1990 | Poletto | 379/413 |
| 5,138,658 | 8/1992 | Carter et al. | 379/413 |

FOREIGN PATENT DOCUMENTS

| | | |
|---|---|---|
| 0182475A1 | 5/1986 | European Pat. Off. . |
| 0185213A3 | 6/1986 | European Pat. Off. . |
| 0482466A1 | 4/1992 | European Pat. Off. . |
| 2065420A | 6/1981 | United Kingdom . |
| 2199719 | 7/1988 | United Kingdom . |

*Primary Examiner*—Krista M. Zele
*Assistant Examiner*—Jacques M. Saint-Surin
*Attorney, Agent, or Firm*—Robert Groover; Betty Formby

[57] ABSTRACT

A circuit for limiting power dissipation through telephone subscriber line power supply interface devices, by using a pair of final stages to which an external component effective to dissipate power is connected. By use of separate discrete reference circuits, the presence of excessive common mode current is detected; and when this occurs, current to the driver stages is controlled at a lower magnitude.

53 Claims, 3 Drawing Sheets

5,596,637

POWER DISSIPATION MANAGER CIRCUIT FOR AN INTERFACE DEVICE FEEDING A SUBSCRIBER TELEPHONE LINE

CROSS-REFERENCE TO RELATED APPLICATION

This application claims priority from EPC App'n 93830188.4, filed Apr. 30, 1993, which is hereby incorporated by reference.

BACKGROUND OF THE INVENTION

This invention relates to a circuit for handling power dissipation through telephone subscriber line power supply interface devices, and particularly to monolithically integratable telephone interface devices and to systems which incorporate them.

Various devices have been proposed for limiting the power dissipated in telephone circuits, to limit (e.g.) the heating of their components. One of these comprises circuitry for limiting the maximum current which can be supplied to the line, in combination with a thermal protection circuit which limits the maximum temperature attainable within the circuit connected to the load. However, although this device functions properly during normal operation of the telephone circuit, it cannot operate effectively when the load is subjected to a longitudinal (i.e. common-mode) current. When the load absorbs a common-mode current from the feed line, devices of the aforesaid type are no longer able to perform their function because the operating threshold of the limiting means is usually higher than the current passing through the telephone in this situation. However, the thermal protection circuit continues to operate, and when it does it changes the operating characteristics of the protected circuit to the extent that its operation becomes unacceptable.

One approach to overcome these drawbacks has been to couple the load-connected circuit to an external component within which part of the power absorbed by the circuit is dissipated. Hence the power dissipated within the circuit is controlled indirectly by controlling the power dissipated within the external component. This method enables good results to be obtained during normal operation of the telephone, but is problematic when the load to which the telephone circuit is connected becomes the center of a common-mode current.

This is because the known devices again in this case suffer from the aforesaid drawbacks, and in particular do not enable the temperature increase in the external component (caused by the increase in the power dissipated within this component) to be limited.

The incorporation of such devices into telephone exchanges of ever more compact design requires that new designs be evolved for circuits and systems to provide improved power distribution and active power control under any operating conditions. Power distribution is performed by using an auxiliary element (e.g. an external transistor), connected to each interface device, which is effective to dissipate some of the power.

Under certain exceptionally severe conditions of the line, and in the presence of longitudinal currents, the dissipated power may fall outside the upper admissible limits by standard packages even in the presence of an external auxiliary element adapted to dissipate some of the power. Such longitudinal currents may be caused by one or both of the line wires being temporarily connected to ground ("ground key" situation), or by failures in the line ("fault" situation).

As known to persons skilled in the art, an electronic interface circuit between a subscriber's telephone line and exchange control components in general comprises a circuit structure of the bridge type formed by two output amplifier components between which the subscriber's telephone line, and all the apparatus connected thereto, is inserted as a load.

These amplifier components drive the line in phase opposition when signals are present.

The "transverse" line current $I_T$ is the sum of the direct current supplying the line and the signal current which is generally of an alternating type. This transverse current $I_T$ is of identical intensity in the two wires of the line, but has opposite directions of flow.

However, if a two-wire telephone line (or more generally a two-wire transmission line) is in the vicinity of electrical lines having an alternating current at power frequencies (or at industrial-use frequencies), or is in the vicinity of other telephone lines in which high intensity signals, such as ringing signals, are being transmitted, such nearby currents may induce "longitudinal" or "common mode" currents $I_{CM}$ in both wires of the telephone line. Such currents will often have identical intensities and directions of flow in both wires of the line.

These common mode currents $I_{CM}$ may, in the cases discussed above, be of an alternating type, but do not, in general, have a waveshape which is fixed over time. Thus, when such induced common mode currents are superimposed on the transverse line current $I_T$, they alter its value in an unpredictable way.

If the overall resultant currents in the wire of the line with the higher potential and the wire of the line with the lower potential are designated conventionally by $I_A$ and $I_B$ respectively, the following may be expressed:

$$I_A = I_T + I_{CM}$$

$$I_B = I_T - I_{CM}$$

in which the actual directions of each current obviously have to be borne in mind in accordance with known electrical conventions.

This shows that it is sufficient, in theory, to add and subtract the total currents $I_A$ and $I_B$ for an immediate "measurement" of the transverse line current $I_T$ and the longitudinal common mode currents $I_{CM}$ respectively. This gives:

$$|I_A + I_B| = 2|I_T|$$

$$|I_A - I_B| = 2|I_{CM}|$$

It is particularly necessary to obtain a measurement of the common mode currents $I_{CM}$ in cases in which these currents are intentionally induced in the line so that specific functions may be carried out (such as are used in private branch exchanges), e,g, to enable the transfer of incoming calls from one subscriber's set directly to another by means of the appropriate key on the set itself.

In reality, a circuit capable of carrying out these simple operations in all longitudinal and transverse current conditions is comparatively complex with the result that it is expensive, if monolithically integrated, both from the point of view of integration area occupation and design problems.

If the adding and subtracting operations on the overall currents in the line are to give representative measurement results under all operating conditions, it is necessary, in the first instance, to take into account the possibility of inversions of the line polarity, since it is this polarity which determines the direction of flow of the transverse current $I_T$ in the line.

In addition, the possibility, particularly in very long transmission lines, in which the transverse line current $I_T$ is obviously reduced, while the probability of longitudinally induced currents is higher, of the intensity of the longitudinal common mode currents $I_{CM}$ being greater than the intensity of the transverse line current $I_T$, should not be neglected.

In this case, the overall currents in the line $I_A$ and $I_B$ have the same direction which is not determined by the line polarity, but is variable over time in a uniform manner with the direction of the common mode currents induced.

Since the active electronic components conduct essentially in a monodirectional manner during normal polarization and operating conditions, a circuit which may be monolithically integrated for measuring longitudinal and transverse line currents must be designed in such a way that it has an overall configuration which is compatible with input currents having any direction.

In telephone interface circuits, as is normally the case for all integrated circuits, there is a maximum instantaneous current limitation to avoid damage to the circuit components (the current limit may have a typical value of 100 mA).

The part of the interface circuit which acts as a supply source for the line operates at high voltages (typically from –48 to –60 V with respect to the ground potential), and the electrical power dissipated is therefore very high.

Adequate limitation of the power dissipated must therefore be provided in the circuit by means of the heat protection conventionally incorporated in integrated circuits.

Several arrangements have been proposed for limiting the maximum current supplied to the line, and hence the amount of power dissipated. Such prior arrangements, while performing their expected function satisfactorily in normal operation of the telephone system, are unable to operate effectively when the line is subjected to a longitudinal or common mode current at a non-zero mean value. In fact, when the load draws a longitudinal current from the supply line, such limiting arrangements may fail to perform their function because their cut-in thresholds are defined with respect to transverse current and do not fully allow for the possible range of conditions in longitudinal current.

Some telephone systems incorporate a thermal protection device which operates, whenever the temperature reaches a predetermined upper threshold level, to change the operational characteristics of the protected system, and, consequently, to disrupt its normal operation.

A circuit structure which enables dissipated power to be controlled even under a condition of line unbalance is described in European Patent Application No. 91117504.0, which is hereby incorporated by reference. That Application discloses a technique whereby in an unbalanced condition of the line, the power dissipated by the subscriber line interface circuit and the external transistor is reduced by limiting the line transversal current. However, the circuit described there can only operate as expected when the transversal current limitation is able to limit the largest longitudinal current, which would only occur when the two line terminations operate in single-quadrant class B.

Additional discussion of subscriber Line Interface Circuits may be found in U.S. Pat. Nos. 5,138,658, 4,908,856, 4,709,388, 4,387,273, 4,381,427, all of which are hereby incorporated by reference.

SUMMARY OF THE INVENTIONS

The disclosed innovations provide a circuit for limiting power dissipation through telephone subscriber line power supply interface devices, by using a pair of final stages to which an external component effective to dissipate power is connected. By use of discrete reference circuits, the presence of excessive common mode current is detected; and when this occurs, current to the driver stages is controlled at a lower magnitude. Preferably a first reference current source provides a maximum current value, and second and third reference circuits are connected to define values of the largest output currents from the final stages which differ from each other by more than a threshold value, thereby maintaining at all times a longitudinal current whose value is greater than said threshold value while still limiting excess currents as needed.

That is, once an imbalance occurs, the drivers 4 and 5 are separately controlled to reduce power consumption WITHOUT reducing the longitudinal current magnitude below the threshold. This avoids loss of any information (such as ground key status) which may be provided by the longitudinal current. This also advantageously reduces cycling into and out of the power-reduction regime. This also provides the advantage of avoiding excess power dissipation without shutting down the subscriber line.

The proposed solution guarantees proper management of power dissipation by the subscriber interface circuit under worst-case conditions, even if non-induced longitudinal currents are present on the line. However, information represented by non-induced longitudinal currents is not lost.

The circuit goes beyond the known approaches to Ground-Key detection, and extends the control range to all possible cases in which one or both of the line wires are connected to any potential between ground and $V_{BAT}$. Thus the disclosed innovations provide a comprehensive line fault control in place of the ground-key function control provided by some previous systems.

According to the disclosed innovations, the information related to the presence of faults or ground-keys is used to automatically decrease the maximum current supplied from the line buffers, so as to guarantee that the power dissipated from the SLIC and from the external transistor is reduced.

The extension of the control to all the voltage range and the extension to line currents over all four possible quadrants are guaranteed by appropriate selection of the line buffers maximum limiting currents. The conditions to be respected are the following:

$|I_{limtip} - I_{limring}| > I_{threshold}$ in a ground-key condition;

$I_{limtip} > I_{limring}$ if $I_{cm}$ is exiting from the SLIC;

$I_{limtip} < I_{limring}$ if $I_{cm}$ is entering into the SLIC.

A further feature is that, when the longitudinal current vanishes, the previous status is automatically restored.

Advantages include the capability to detect the line conditions in which the dissipated powers, in power distribution systems, are exceeding the values handling into standard signal packages, covering the range of potentials between ground and VBAT and the 4 quadrants, guarantees a control to reduce the power maximum values, and allows to utilize standard signal packages, included that used in SMT technologies.

The disclosed inventions advantageously provide a circuit for handling power dissipation through a telephone subscriber line power supply interface device, which is effective to protect the aforesaid system even on the occurrence of line longitudinal currents larger than the transversal current, and accordingly, even in all those possible cases when either or both of the line wires are at any potential in the range from ground potential to the potential of the battery to which the device is connected. In this way, additionally to ground-key situations, any possible failure situations in the line can be handled.

The disclosed inventions also advantageously provide a circuit which can also provide effective protection for the external component(s) associated with the interface device to dissipate power.

The disclosed inventions also advantageously enable incorporation of the telephone subscriber line interface device into standard signal packages, including SMT (Surface Mount Technology) ones.

According to a disclosed class of innovative embodiments, there is provided: an integrated circuit for connection to an output stage of an interface device supplying a telephone subscriber line and to external power-dissipating components, comprising: sensor circuits connected to detect longitudinal and transverse currents on the telephone subscriber line, and to provide corresponding outputs; a comparator circuit connected to compare at least one of said sensor outputs against a threshold value, and thereby to detect when said longitudinal current exceeds a first threshold current; a reference circuit operatively connected to the output stage of the interface device to provide predetermined and different maximum current values to be supplied to the telephone subscriber line according to the relative magnitude of said longitudinal current detected on the telephone subscriber line and of said first threshold current, the selection between said maximum current values being controlled by said comparator circuits; and a control circuit coupled to said comparator circuit, and connected to compare at least one of said sensor outputs and to turn off the external power-dissipating components when said detected transverse current exceed a second threshold current.

According to another disclosed class of innovative embodiments, there is provided: an integrated circuit for connection to first and second final amplifier stages of an interface circuit supplying a telephone subscriber line and to external power-dissipating components, comprising: sensor circuits connected to detect longitudinal and transverse currents on the telephone subscriber line, and to provide corresponding outputs; a comparator connected to compare at least one of said sensor output against a threshold value, and thereby to detect when said longitudinal current exceeds a first threshold current; first, second and third reference circuits, to provide predetermined and different maximum current values to be supplied from the first and second final amplifier stages to the telephone subscriber line, according to the longitudinal current detected on the telephone subscriber line, in such relation that: when said detected longitudinal current remains below said first threshold current, said first reference circuit is connected to both the final amplifier stages to define a first maximum current limit therethrough, and when said detected longitudinal current exceeds said first threshold current, both said second and third reference circuits are connected respectively to one of the first and second final amplifier stages, to define a second maximum current limit therethrough; a connection and switching circuit for selectively connecting the first and second final amplifier stages to said reference circuits, said connections and switching circuit being controlled by said comparator; and a control circuit coupled to said comparator, and connected to compare at least one sensor output and to turn off the external power-dissipating components when said detected transverse current exceed a second threshold current.

According to another disclosed class of innovative embodiments, there is provided: a system, comprising: connections for a telephone subscriber line; an interface device, supplying said telephone subscriber line from an output stage; sensor circuits connected to detect longitudinal and transverse currents on said telephone subscriber line, and to provide corresponding outputs; a comparator circuit connected to compare at least one of said sensor outputs against a threshold value, and thereby to detect when said longitudinal current exceeds a first threshold current; a reference circuit operatively connected to said output stage of said interface device to provide predetermined and different maximum current values to be supplied to said telephone subscriber line according to said longitudinal current detected on the telephone subscriber line, the selection between said maximum current values being controlled by said comparator circuits; external power-dissipating components, connected to said output stage of said interface device; and a control circuit coupled to said comparator circuit, and connected to compare at least one sensor output and to turn off said external power-dissipating components when said detected transverse current exceed a second threshold current.

According to another disclosed class of innovative embodiments, there is provided: a system, comprising: connections for a telephone subscriber line; first and second final amplifier stages of an interface device, connected to drive the telephone subscriber line; sensor circuits connected to detect longitudinal and transverse currents on said telephone subscriber line, and to provide corresponding outputs; a comparator connected to compare at least one of said sensor output against a threshold value, and thereby to detect when said longitudinal current exceeds a first threshold current; first, second and third reference circuits, to provide predetermined and different maximum current values to be supplied from said first and second final amplifier stages to said telephone subscriber line, according to the longitudinal current detected on said telephone subscriber line, in such relation that: when said detected longitudinal current remain below said first threshold current said first reference circuit is connected to both said final amplifier stages to define a first maximum current limit therethrough, and when said detected longitudinal current exceeds said first threshold current both said second and third reference circuits are connected respectively to one of said first and second final amplifier stages, to define a second maximum current limit therethrough; a connection and switching circuit configured and connected to selectively connect said first and second final amplifier stages to said reference circuits, said connections and switching circuit being controlled by said comparator; external power-dissipating components, connected to said first and second final amplifier stages of said interface device; and a control circuit coupled to said comparator, and connected to compare at least one sensor output and to turn off said external power-dissipating components when said detected transverse current exceed a second threshold current.

According to another disclosed class of innovative embodiments, there is provided: a circuit for interfacing to a subscriber line interface, comprising: sensors connected to detect longitudinal and transverse currents on the subscriber line interface, and to provide corresponding outputs; a comparator connected to compare at least one said sensor output against a threshold value, and thereby to detect when the longitudinal current exceeds a threshold current; first and second final amplifier stages each connected to drive a respective line of said subscriber line interface; an external power-dissipating circuit connected to controllably impede current flow between said final amplifier stages and at least one power supply voltage; first, second, and third reference-current sources, operatively connected to be selectively connectable to said final stages in such relation that: when the longitudinal current is less than a substantially predetermined threshold value said first reference-current source is connected to both said final stages to define a first maximum current limit therethrough; when the longitudinal current is greater than said threshold value either said second or third reference-current source is connected to one of said final stages, to define a second maximum current limit therethrough which is less than said first maximum current limit.

According to another disclosed class of innovative embodiments, there is provided: a circuit, comprising: sensors connected to detect longitudinal and transverse currents on a subscriber line interface, and to provide corresponding outputs; a comparator connected to compare at least one said sensor output against a threshold value, and thereby to detect when the longitudinal current exceeds a threshold current; first and second final amplifier stages each connected to drive a respective line of said subscriber line interface; an external power-dissipating circuit connected to controllably impede current flow between said final amplifier stages and at least one power supply voltage; first, second, and third reference-current sources, operatively connected to be selectively connectable to said final stages in such relation that: when the longitudinal current is less than a substantially predetermined threshold value said first reference-current source is connected to both said final stages to define a first maximum current limit therethrough; when the longitudinal current has a positive sign and a magnitude greater than said threshold value, said second reference-current source is connected to said first final amplifier stage and said third reference-current source is connected to said second final amplifier stage, to define respective maximum current limits therethrough; and when the longitudinal current has a positive sign and a magnitude greater than said threshold value, said second reference-current source is connected to said first final amplifier stage and said third reference-current source is connected to said second final amplifier stage, to define respective maximum current limits therethrough.

According to another disclosed class of innovative embodiments, there is provided: a circuit for handling power dissipation through a telephone subscriber line power supply interface device using a pair of amplifier final stages provided with output terminals which are coupled to the line, wherein the device power dissipation is controlled by limiting the maximum current being supplied into the line according to the values of the longitudinal currents present on the line.

According to another disclosed class of innovative embodiments, there is provided: a method of limiting the power dissipated by a telephone subscriber line interface device supplying a current to the line and by external power-dissipating components connected thereto, comprising the steps of: sensing transversal and longitudinal currents on the telephone subscriber line; comparing the values of said detected transversal and longitudinal currents with first and second fixed threshold currents; selecting different predetermined maximum values for the current supplied to the line from the interface device, according to the relative magnitude of said detected longitudinal current and of said first threshold current; simultaneously disabling the external power-dissipating components when said detected transversal current exceeds said second threshold current.

BRIEF DESCRIPTION OF THE DRAWING

The present invention will be described with reference to the accompanying drawings, which show important sample embodiments of the invention and which are incorporated in the specification hereof by reference, wherein.

DETAILED DESCRIPTION

Figure 1:
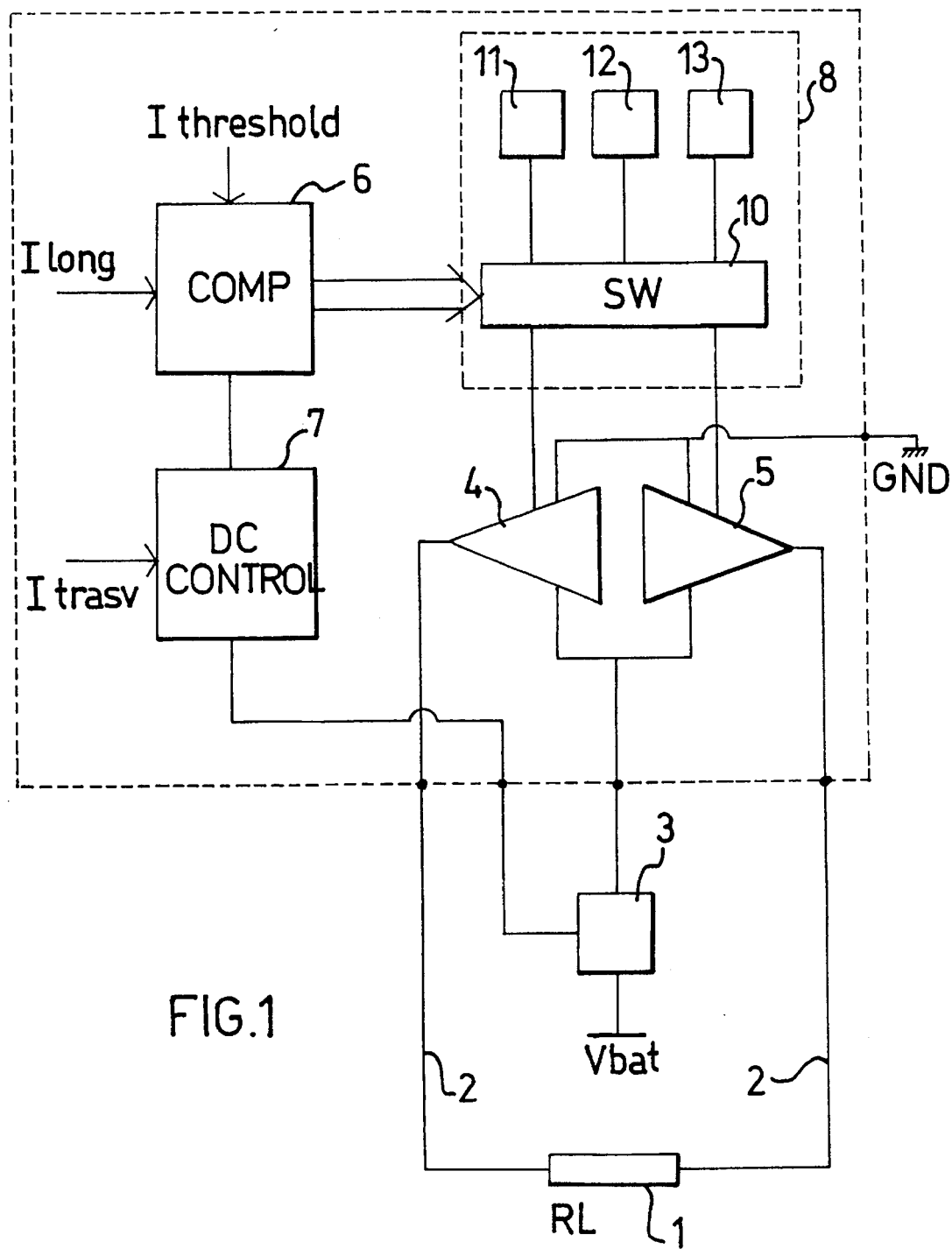
FIG. 1 shows diagrammatically an embodiment of a circuit for handling power dissipation by a telephone subscriber line power supply interface device according to the invention.

In the presently preferred embodiment (which is merely illustrative of the range of disclosed inventions, and does not delimit any of the claims), the scheme shown diagrammatically in FIG. 1 comprises:

a load 1 connected to a telephone subscriber line 2;

two final amplifier stages 4 and 5 of an interface device coupled to the telephone line;

circuit means, not shown in the drawing, for sensing the appearance of transversal currents and longitudinal currents on the line;

connection and switching circuit means 10 for coupling the two final stages to reference circuit means 11, 12 and 13, said connection and switching circuit means being driven by comparator circuit means 6 connected to the circuit means (not shown) for sensing longitudinal currents on the line; and an external power-dissipating component 3 connected to the final stages of the device and controlled by control circuit means 7 being responsive to transversal line currents and coupled to the comparator circuit means.

The circuit shown in FIG. 1 operates as follows. The two final stages 4 and 5 of the interface device are operative to supply a current into the telephone line 2 and to the external power-dissipating component 3 and are coupled, via the connection and switching circuit means 10, to the reference circuit means 11, 12 and 13 setting respective upper limiting currents in the two final stages 4 and 5. The external component 3 is driven by the control circuit means 7 responsive to transversal line currents.

The connection and switching circuit means are controlled by the comparator circuit means 6. Such a comparator circuit means 6 will, through the connection and switching circuit means 10, enable connection of both final stages to the first reference circuit 11 if mean values of the common mode current are below a predetermined threshold value, whereas at mean values of that current above said threshold value, they will instead enable connection of the device final stages to the second and the third reference circuit means, according to the sense of the longitudinal current on the line. Thus, the upper values of the current to be output from the final stages are lowered. In addition, the comparator circuit means will disable the external component 3 through the control circuit means 7 on the occurrence of values of the line transversal current above a predetermined threshold value.

The second and third reference circuits 12 and 13 define values of the largest output currents from the final stages which differ from each other by a larger value than threshold, thereby maintaining at all times a longitudinal current on the line whose value is greater than said threshold value.

The reference circuits 11, 12, and 13 may be implemented using constant current sources whose values are compared with the current from the final stage. The sensor circuits (shown in FIG. 2) operate to sense transversal currents and longitudinal currents, and may be implemented as described in U.S. Pat. No. 4,782,507 (or corresponding Italian Patent No. 1215254), both of which are hereby incorporated by reference. Alternatively, the comparator circuit 6 may be implemented by ordinary threshold comparators. Lastly, the connection and switching circuits 10 may be simple electronic switches, e.g. bipolar transistors driven into conduction and cutoff.

Figure 2:
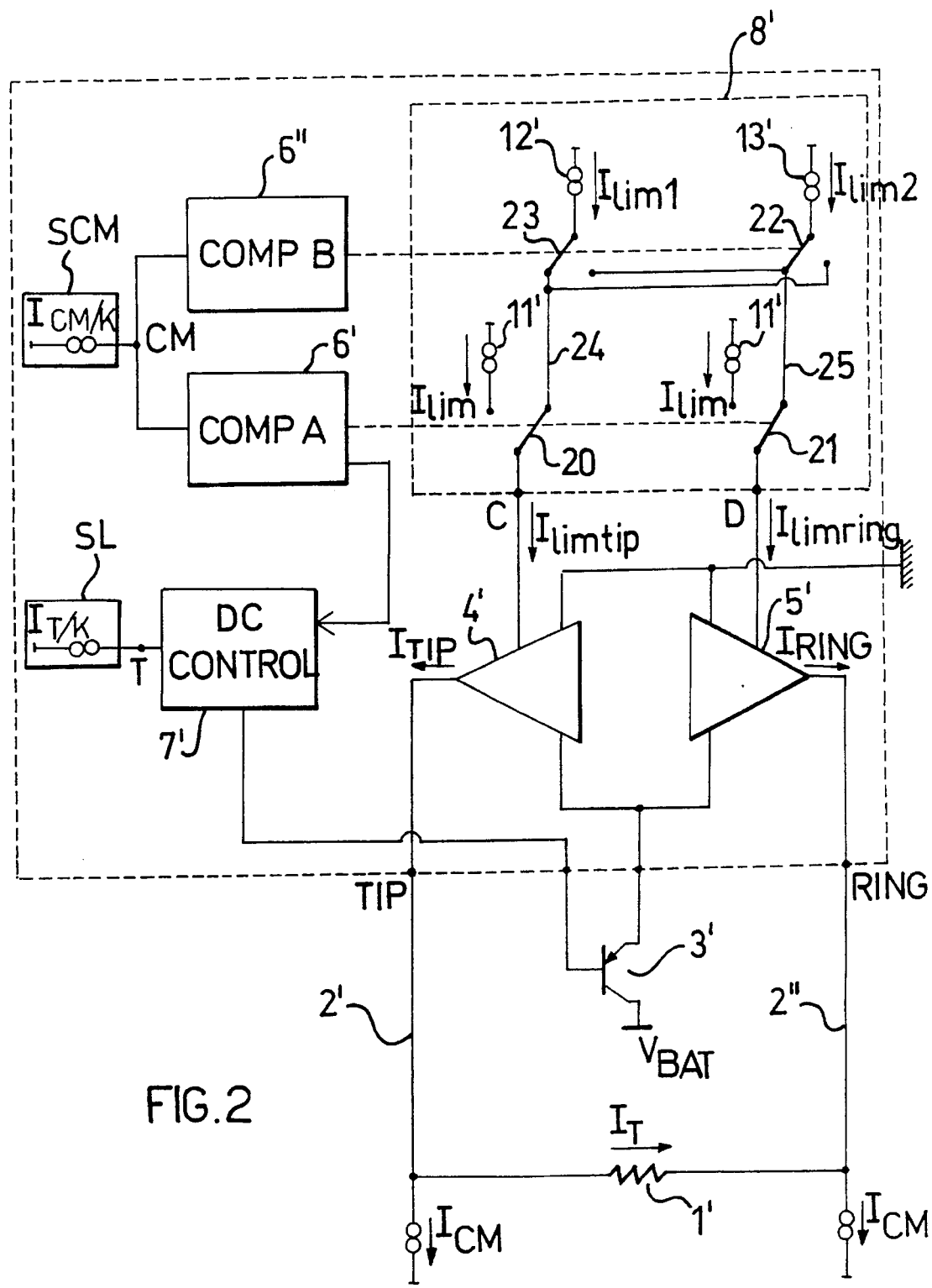
FIG. 2 shows a sample implementation of the circuit of FIG. 1.

FIG. 2 shows details of a sample implementation of the system of FIG. 1. In this example, load 1 is shown as a resistor 1', and in the following discussion it will be assumed to be a telephone. The telephone subscriber line, consisting of a tip wire 2' and a ring wire 2", and the resistor 1' form a remote circuit connected to a central office between tip and ring terminals, shown in FIG. 2 as nodes TIP and RING respectively. The final amplifier stages 4 and 5 of the interface device are shown separately as tip buffer 4' and ring buffer 5'. The reference circuits are implemented as current sources 11', 12' and 13'. These current sources are coupled to the tip and ring buffers 4' and 5' through electronic switches 20, 21, 22 and 23, and legs 24 and 25, schematically shown in FIG. 1 as connection and switching circuits 10. Nodes C and D allow connection to the buffers 4' and 5'. Specifically, the switches 20 and 21 connect the tip and ring buffers 4' and 5' either to the two current sources 11' or alternatively to the legs 24 and 25 coupled to the current sources 12' and 13'. The switches 22 and 23 connect the legs 24 and 25 respectively to the current sources 12' and 13' (or vice versa, depending on the state of the switches). The electronic switches 20, 21, 22 and 23 are driven by comparator circuits COMPA and COMPB (6' and 6") connected through a node CM to the sensor circuits for sensing longitudinal (or common mode) currents on line. (The sensors are shown schematically in FIG. 2 as a current source SCM.) The comparator circuit COMPA operates to drive the switches 20 and 21 according to the relative magnitude of the detected longitudinal current on line and of the predetermined threshold current $I_{thr}$.

On the other hand, COMPB drives the switches 22 and 23 according to the sign of the longitudinal current on line. The external power dissipating component is shown in FIG. 2 as a PNP transistor 3', connected to the tip and ring buffers 4' and 5' and controlled by the DC control circuit, shown as 7', responsive to transversal currents. The connection of control circuit 7' to the sensor circuits (SL in FIG. 2) sensing line transversal currents, is performed through a node T. The control circuit 7' is coupled specifically to the comparator circuit COMPA.

All elements in FIG. 1, except the load 1, would typically be part of a central office switch, and all elements except the load 1 and external component 3 would preferably be part of a single integrated package.

In FIG. 2 the currents flowing through the line are also shown. The line transversal current is shown as $I_T$. $I_{CM}$ represents instead the longitudinal or common mode current, having the same value and direction of flow in both the wires of the line. Currents $I_{TIP}$ and $I_{RING}$ are supplied to the tip and ring wires (2' and 2") by the tip and ring buffers 4' and 5'.

The operation of circuit of FIG. 2 is the following. The maximum output currents from tip and ring buffers 4' and 5' are set by the predetermined values of limiting currents ($I_{limtip}$ and $I_{limring}$) at C and D nodes respectively. These limiting currents depend on the connected reference current sources, setting different maximum currents $I_{lim}$, $I_{lim1}$ and $I_{lim2}$, respectively being supplied from the current sources 11', 12' and 13'. The comparator circuit COMPA compares the output signal from the sensor circuit SCM with a predetermined threshold signal to determine when the detected longitudinal or common mode current exceeds the threshold current $I_{thr}$. The output of the sensor SCM is proportional to the longitudinal current on line by means of a constant coefficient k and is shown in FIG. 2 as $I_{CM}/k$. The comparator COMPA is then effective to drive the electronic switches 20 and 21 so as to enable connection of both buffers 4' and 5' to the current source 11' when the detected longitudinal current remains below the threshold current value. In this case $I_{limtrip}$ and $I_{limring}$ are equal. Otherwise, the switches 20 and 21 connect the nodes C and D to the legs 24 and 25, therefore coupling the buffers 4' and 5' to the other current sources 12' and 13'. The maximum currents supplied from the current sources 12' and 13' are chosen so as to respect the following conditions:

$$I_{lim1} > I_{lim2};$$

$$|I_{lim1} - I_{lim2}| > I_{thr}.$$

Therefore when the connection is to the current sources 12' and 13', $I_{limtip}$ and $I_{limring}$ are different, selecting different maximum current values to be supplied to the tip and ring wires of the line. The difference between those maximum current values is also greater than the threshold current value. The comparator circuit COMPB, receiving the output signal from the sensor SCM, is responsive to the sign of the detected common mode current on line. Therefore, when the common mode current on line exceeds the threshold value, the comparator circuit COMPB enables connection of the tip and ring buffers 4' and 5' to the current sources 12' and 13' (or vice versa) so as to maintain a current on line greater than the threshold value. The operation of the circuit in FIG. 2, in relation to a particular embodiment, will be discussed more specifically referring to FIG. 3.

In addition, the DC control circuit 7' receive from the sensor circuit SL a signal proportional to the line transversal current ($I_T/k$) and the coupling to the comparator circuit COMPA allows to control the external transistor 3' depending on the relative magnitude of the currents on line and of the threshold current.

Figure 3:
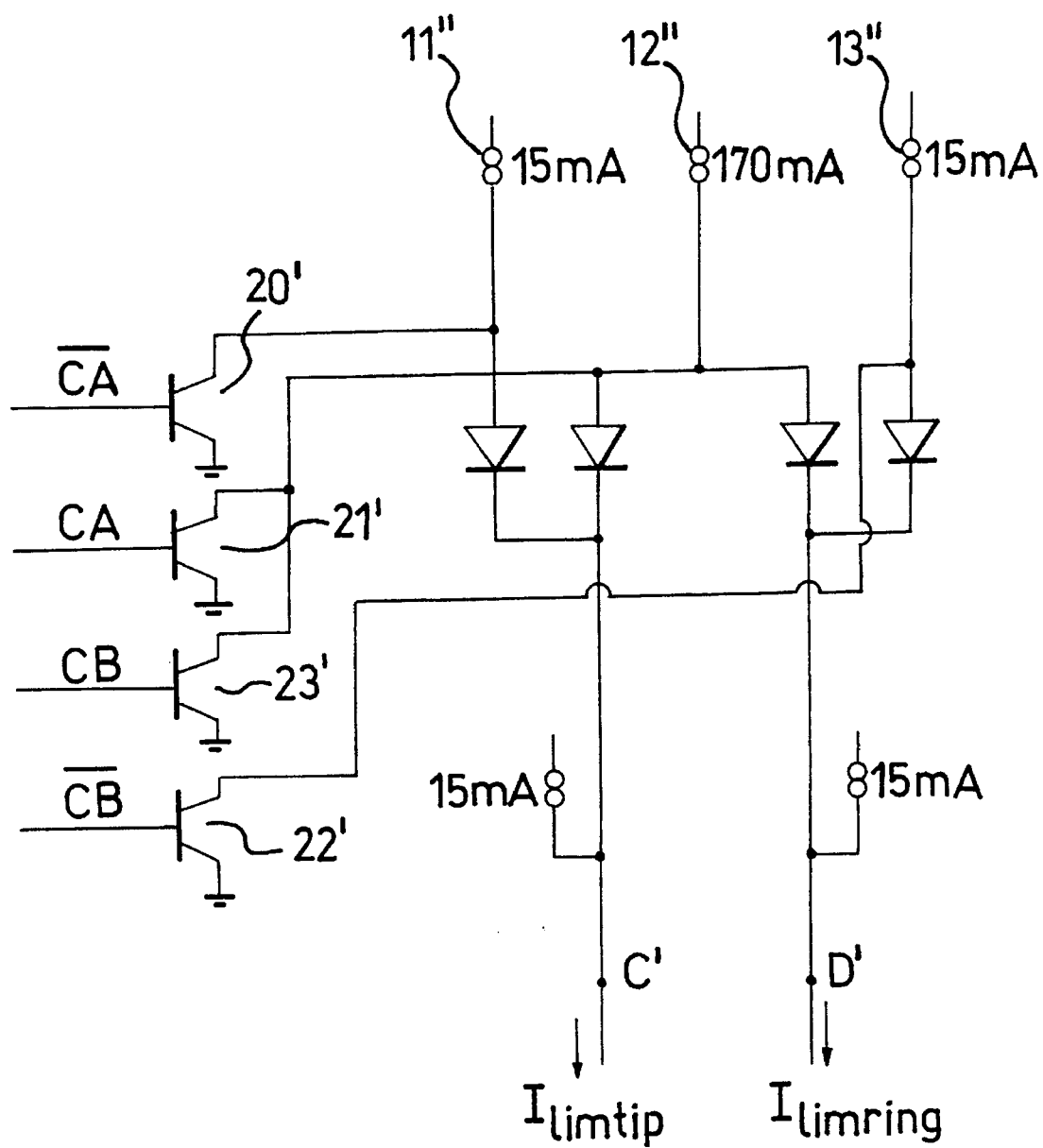
FIG. 3 shows, in greater detail, an other sample implementation of a portion of the circuit of FIG. 1.

FIG. 3 shows a sample implementation of the block 8' of FIG. 2. The electronic switches are shown as bipolar transistors 30', 31', 32' and 33', operatively connected to current sources 14, 15 and 16. The switch transistors are driven into conduction and cutoff by the comparator circuits (shown in FIG. 2 as COMPA and COMPB and not shown in FIG. 3), according to output signals from that COMPA and COMPB. The driving signals are referred as CA, CA\, CB and CB\ in FIG. 3 (CA\ and CB\ represent the complementary signals, e.g. exiting from an inverter). In FIG. 3, the current sources 17 and 18, allowing a correct operation of the circuit, are also shown. In this embodiment, the maximum current values from the current sources are exemplifically shown in FIG. 3. The current sources 14", 15", 16", 17" and 18" can be implemented e.g. by transistors.

Table 1 shown the values of the maximum currents at the nodes C' and D', i.e. $I_{limtip}$ and $I_{limring}$, according to the comparator outputs. The value 1 for CA means $I_{CM} > I_{thr}$ and the value 1 for CB means that the current $I_{CM}$ on the tip and ring wires has the sign as shown in

TABLE 1

| FIG. 2 (exiting). | | | |
| --- | --- | --- | --- |
| CA | CB | $I_{limtip}$ | $I_{limring}$ |
| 0 | 0 | 100 | 100 |
| 1 | 0 | 30 | 15 |
| 0 | 1 | 15 | 30 |
| 1 | 1 | 30 | 30 |

The disclosed innovations provide at least the following advantages:

protection for an interface device to which it has been connected, as well as for external components associated therewith, in all those critical cases of line unbalance where either or both wires are brought to a potential whatever between ground and battery potentials; and incorporation (by virtue of its ability to control power dissipation under any conditions) of the whole subscriber line interface device into a standard signal package, which brings about additional benefits in terms of occupied volume and cost.

Of course, the disclosed innovative structure can be modified in a wide variety of ways. For example, the longitudinal and transverse currents can be tested against threshold values which may differ by various amounts, or may be the same; and the two comparators which test the longitudinal current may have the same thresholds, or their thresholds may differ by various determined amounts.

What is claimed is:

1. An integrated circuit for connection to an output stage of an interface device supplying a telephone subscriber line and to external power-dissipating components, comprising:

sensor circuits connected to detect longitudinal and transverse currents on the telephone subscriber line, and to provide corresponding outputs;

a comparator circuit connected to compare at least one of said sensor outputs against a threshold value, and thereby to detect when said longitudinal current exceeds a first threshold current;

a reference circuit operatively connected to the output stage of the interface device to provide predetermined and different maximum current values to be supplied to the telephone subscriber line according to the relation between the respective magnitudes of said longitudinal current detected on the telephone subscriber line and of said first threshold current, said comparator circuit controlling a selection between said maximum current values; and a control circuit coupled to said comparator circuit, and connected to compare at least one of said sensor outputs and to turn off the external power-dissipating components when said detected transverse current exceed a second threshold current.

2. An integrated circuit according to claim 1, wherein, when said detected longitudinal current on the line remains below said first threshold current, said reference circuit is connected to the output stages of the interface device to define a first maximum current therethrough, and, when said detected longitudinal current exceeds said first threshold current, said reference circuit is connected to define a second maximum current, the value of said second maximum current being greater than that of said first maximum current.

3. An integrated circuit according to claim 2, wherein, when said detected longitudinal current exceeds said first threshold current, said reference circuit is connected to the output stage of the interface device to maintain a current through the line of value greater than said threshold value.

4. An integrated circuit according to claim 1, wherein said reference circuit comprises different current sources which provide said different maximum current values.

5. An integrated circuit according to claim 1, wherein said reference circuit is connected to the output stage of the interface device through electronic switches controlled by said comparator circuit.

6. An integrated circuit according to claim 1, wherein said comparator circuit comprises a threshold comparator.

7. An integrated circuit according to claim 1, wherein said sensor circuits are connected to receive first and second total currents flowing through two wires of the line, said total currents being sum of the transversal and longitudinal currents, and to provide first and second output currents, the value thereof being proportional respectively to the line transverse and longitudinal current by means of first and second predetermined constant coefficients.

8. An integrated circuit according to claim 7, wherein said sensor circuits comprise current mirrors which determine said first and second constant coefficients.

9. An integrated circuit according to claim 1, wherein the output stage of the interface device comprises first and second amplifiers supplying current to the telephone subscriber line.

10. An integrated circuit according to claim 1, wherein the external power dissipating components consist of a single pnp bipolar transistor.

11. An integrated circuit for connection to first and second final amplifier stages of an interface circuit supplying a telephone subscriber line and to external power-dissipating components, comprising:

sensor circuits connected to detect longitudinal and transverse currents on the telephone subscriber line, and to provide corresponding outputs;

a comparator connected to compare at least one of said sensor output against a threshold value, and thereby to detect when said longitudinal current exceeds a first threshold current;

first, second and third reference circuits, to provide predetermined and different maximum current values to be supplied from the first and second final amplifier stages to the telephone subscriber line, according to the longitudinal current detected on the telephone subscriber line, in such relation that:

when said detected longitudinal current remains below said first threshold current, said first reference circuit is connected to both the final amplifier stages to define a first maximum current limit therethrough, and when said detected longitudinal current exceeds said first threshold current, both said second and third reference circuits are connected respectively to one of the first and second final amplifier stages, to define a second maximum current limit therethrough;

a connection and switching circuit for selectively connecting the first and second final amplifier stages to said reference circuits, said connections and switching circuit being controlled by said comparator; and a control circuit coupled to said comparator, and connected to compare at least one sensor output and to turn off the external power-dissipating components when said detected transverse current exceed a second threshold current.

12. An integrated circuit according to claim 11, wherein when said detected longitudinal current exceeds said first threshold current said second and third reference circuits are connected respectively to the first and second final amplifier stages or vice versa according to the sense of said longitudinal current.

13. An integrated circuit according to claim 11, wherein said first maximum current limit is lower than said second maximum current limit.

14. An integrated circuit according to claim 11, wherein, when said detected longitudinal current exceeds said first threshold current, said second and third reference circuit are connected to the first and second final amplifier stages to maintain a current through the line greater than said threshold current.

15. An integrated circuit according to claim 11, wherein said first, second and third reference circuits consist of current sources which provide said different maximum current values.

16. An integrated circuit according to claim 11, wherein said connection and switching circuit consists of electronic switches.

17. An integrated circuit according to claim 16, wherein said electronic switches comprise bipolar transistors driven into conduction and cutoff by said comparator.

18. An integrated circuit according to claim 11, wherein said comparator is a threshold comparator.

19. An integrated circuit according to claim 11, wherein said sensor circuits are connected to receive first and second total currents flowing through two wires of the line, said total currents being sum of the transversal and longitudinal currents, and to provide first and second output currents, the value thereof being proportional respectively to the line transverse and longitudinal current by means of first and second predetermined constant coefficients.

20. An integrated circuit according to claim 11, wherein the external power-dissipating components are transistors.

21. An integrated circuit according to claim 17, wherein said sensor circuits comprise current mirrors which determine said first and second constant coefficients.

22. An integrated circuit according to claim 11, wherein the external power dissipating components consist of a single pnp bipolar transistor.

23. A system, comprising:

connections for a telephone subscriber line;

an interface device, supplying said telephone subscriber line from an output stage;

sensor circuits connected to detect longitudinal and transverse currents on said telephone subscriber line, and to provide corresponding outputs;

a comparator circuit connected to compare at least one of said sensor outputs against a threshold value, and thereby to detect when said longitudinal current exceeds a first threshold current;

a reference circuit operatively connected to said output stage of said interface device to provide predetermined and different maximum current values to be supplied to said telephone subscriber line according to said longitudinal current detected on the telephone subscriber line, said comparator circuit controlling a selection between said maximum current values; and external power-dissipating components, connected to said output stage of said interface device; and a control circuit coupled to said comparator circuit, and connected to compare at least one sensor output and to turn off said external power-dissipating components when said detected transverse current exceed a second threshold current.

24. The system of claim 23, wherein, when said detected longitudinal current on the line remains below said first threshold current, said reference circuit is connected to the output stages of the interface device to define a first maximum current therethrough, and, when said detected longitudinal current exceeds said first threshold current, said reference circuit is connected to define a second maximum current, the value of said second maximum current being greater than that of said first maximum current.

25. The system of claim 23, wherein, when said detected longitudinal current exceeds said first threshold current, said reference circuit is connected to the output stage of the interface device to maintain a current through the line of value greater than said threshold value.

26. The system of claim 23, wherein said reference circuit comprises different current sources which provide said different maximum current values.

27. The system of claim 23, wherein said reference circuit is connected to the output stage of the interface device through electronic switches controlled by said comparator circuit.

28. The system of claim 23, wherein said sensor circuits are connected to receive first and second total currents flowing through two wires of the line, said total currents being sum of the transversal and longitudinal currents, and to provide first and second output currents, the value thereof being proportional respectively to the line transverse and longitudinal current by means of first and second predetermined constant coefficients.

29. The system of claim 23, wherein said sensor circuits comprise current mirrors which determine said first and second constant coefficients.

30. The system of claim 23, wherein the output stage of the interface device comprises first and second amplifiers supplying current to the telephone subscriber line.

31. The system of claim 23, wherein the external power dissipating components consist of a single pnp bipolar transistor.

32. A system, comprising:

connections for a telephone subscriber line; first and second final amplifier stages of an interface device, connected to drive the telephone subscriber line;

sensor circuits connected to detect longitudinal and transverse currents on said telephone subscriber line, and to provide corresponding outputs;

a comparator connected to compare at least one of said sensor output against a threshold value, and thereby to detect when said longitudinal current exceeds a first threshold current;

first, second and third reference circuits, connected to provide predetermined and different maximum current values to be supplied from said first and second final amplifier stages to said telephone subscriber line, according to the longitudinal current detected on said telephone subscriber line, in such relation that:

when said detected longitudinal current remains below said first threshold current, said first reference circuit is connected to both said final amplifier stages to define a first maximum current limit therethrough, and when said detected longitudinal current exceeds said first threshold current both said second and third reference circuits are connected respectively to one of said first and second final amplifier stages, to define a second maximum current limit therethrough;

a connection and switching circuit configured and connected to selectively connect said first and second final amplifier stages to said reference circuits, said connections and switching circuit being controlled by said comparator;

external power-dissipating components, connected to said first and second final amplifier stages of said interface device; and a control circuit coupled to said comparator, and connected to compare at least one sensor output and to turn off said external power-dissipating components when said detected transverse current exceed a second threshold current.

33. An integrated circuit according to claim 32, wherein when said detected longitudinal current exceeds said first threshold current said second and third reference circuits are connected respectively to the first and second final amplifier stages or vice versa according to the sense of said longitudinal current.

34. An integrated circuit according to claim 32, wherein said first maximum current limit is lower than said second maximum current limit.

35. An integrated circuit according to claim 32, wherein, when said detected longitudinal current exceeds said first threshold current, said second and third reference circuit are connected to the first and second final amplifier stages to maintain a current through the line greater than said threshold current.

36. An integrated circuit according to claim 32, wherein said first, second and third reference circuits consist of current sources which provide said different maximum current values.

37. An integrated circuit according to claim 32, wherein said sensor circuits are connected to receive first and second total currents flowing through two wires of the line, said total currents being sum of the transversal and longitudinal currents, and to provide first and second output currents, the value thereof being proportional respectively to the line transverse and longitudinal current by means of first and second predetermined constant coefficients.

38. An integrated circuit according to claim 32, wherein the external power dissipating components consist of a single pnp bipolar transistor.

39. A circuit for interfacing to a subscriber line interface, comprising:

sensors connected to detect longitudinal and transverse currents on the subscriber line interface, and to provide corresponding outputs;

a comparator connected to compare at least one said sensor output against a threshold value, and thereby to detect when the longitudinal current exceeds a threshold current;

first and second final amplifier stages each connected to drive a respective line of said subscriber line interface;

an external power-dissipating circuit connected to controllably impede current flow between said final amplifier stages and at least one power supply voltage;

first, second, and third reference-current sources, operatively connected to be selectively connectable to said final stages in such relation that:

when the longitudinal current is less than a substantially predetermined threshold value said first reference-current source is connected to both said final stages to define a first maximum current limit therethrough;

when the longitudinal current is greater than said threshold value either said second or third reference-current source is connected to one of said final stages, to define a second maximum current limit therethrough which is less than said first maximum current limit.

40. The circuit of claim 39, wherein said external power dissipating circuit consists of a single pnp bipolar transistor.

41. A circuit, comprising:

sensors connected to detect longitudinal and transverse currents on a subscriber line interface, and to provide corresponding outputs;

a comparator connected to compare at least one said sensor output against a threshold value, and thereby to detect when the longitudinal current exceeds a threshold current;

first and second final amplifier stages each connected to drive a respective line of said subscriber line interface;

an external power-dissipating circuit connected to controllably impede current flow between said final amplifier stages and at least one power supply voltage;

first, second, and third reference-current sources, operatively connected to be selectively connectable to said final stages in such relation that:

when the longitudinal current is less than a substantially predetermined threshold value said first reference-current source is connected to both said final stages to define a first maximum current limit therethrough;

when the longitudinal current has a positive sign and a magnitude greater than said threshold value, said second reference-current source is connected to said first final amplifier stage and said third reference-current source is connected to said second final amplifier stage, to define respective maximum current limits therethrough; and when the longitudinal current has a positive sign and a magnitude greater than said threshold value, said second reference-current source is connected to said first final amplifier stage and said third reference-current source is connected to said second final amplifier stage, to define respective maximum current limits therethrough.

42. A circuit according to claim 41, wherein when said detected longitudinal current exceeds said threshold current said second and third reference circuits are connected respectively to the first and second final amplifier stages or vice versa according to the sense of said longitudinal current.

43. A circuit according to claim 41, wherein said first maximum current limit is lower than said second maximum current limit.

44. A circuit according to claim 41, wherein, when said detected longitudinal current exceeds said threshold current, said second and third reference circuit are connected to the first and second final amplifier stages to maintain a current through the line greater than said threshold current.

45. A circuit according to claim 41, wherein said sensors are connected to receive first and second total currents flowing through two wires of the line, said total currents being sum of the transversal and longitudinal currents, and to provide first and second output currents, the value thereof being proportional respectively to the line transverse and longitudinal current by means of first and second predetermined constant coefficients.

46. A circuit for handling power dissipation through a telephone subscriber line power supply interface device using a pair of amplifier final stages provided with output terminals which are coupled to the line, wherein the device power dissipation is controlled by limiting the maximum current being supplied into the line according to the values of the longitudinal currents present on the line; comprising a sensing circuit effective to sense common mode currents on the line, and comprising a comparator circuit effective to compare the mean value of the longitudinal currents on the line with predetermined threshold values and to drive a program unit for the maximum admissible currents into the line by the interface device connected to the line terminals, wherein said program unit comprises at least first, second, and third reference circuits effective to set, in the final stages of the device to which they are coupled, predetermined different values for the maximum admissible currents supplied to the line, and connection and switching circuit means connected between the final stages of the device and said comparator circuit means.

47. A circuit according to claim 46, wherein said comparator circuit enables connection of both final stages to the first reference circuit at mean values of the common mode current below a predetermined threshold value, and at mean values of that current above said threshold value, enable connection of the device final stages, the one to said second circuit and the other to said third reference circuit, or vice versa, according to the sense of the common mode current on the line.

48. A circuit according to claim 46, further comprising at least one external component, effective to dissipate power connected to the interface device, which is connected to be driven into conduction by a control circuit responsive to the presence of common mode line currents, wherein such control circuit is coupled to said comparator circuit, and is configured to disable said external component upon the mean value of the common mode current exceeding the threshold value.

49. A circuit according to claim 47, wherein said second and third reference circuits are effective to set such values for the maximum output currents from the final stages as to cause them to differ from each other by a larger value than the threshold value.

50. A circuit according to claim 47, further comprising at least one external component, effective to dissipate power connected to the interface device, which is connected to be driven into conduction by a control circuit responsive to the presence of common mode line currents, wherein such control circuit is coupled to said comparator circuit, and is configured to disable said external component upon the mean value of the common mode current exceeding the threshold value.

51. A method of limiting the power dissipated by a telephone subscriber line interface device supplying a current to the line and by external power-dissipating components connected thereto, comprising the steps of:

sensing transversal and longitudinal currents on the telephone subscriber line;

comparing the values of said detected transversal and longitudinal currents with a first and second fixed threshold currents;

selecting different predetermined maximum values for the current supplied to the line from the interface device, according to the relative magnitude of said detected longitudinal current and of said first threshold current;

simultaneously disabling the external power-dissipating components when said detected transversal current exceeds said second threshold current.

52. A method according to claim 51, wherein said predetermined maximum values for the current supplied to the line are selected so that:

when said detected longitudinal current remain below said first threshold current, a first maximum current value is set through the output stage of the interface device, and when said detected longitudinal current exceeds said first threshold current, a second maximum current value is set, said second maximum current value being greater than said first maximum current value.

53. A method according to claim 52, wherein when said detected longitudinal current exceeds said first threshold current a current through the line of value greater than said threshold value is maintained.

* * * * *